(12) United States Patent
Jensen et al.

(10) Patent No.: US 7,149,878 B1
(45) Date of Patent: Dec. 12, 2006

(54) CHANGING INSTRUCTION SET ARCHITECTURE MODE BY COMPARISON OF CURRENT INSTRUCTION EXECUTION ADDRESS WITH BOUNDARY ADDRESS REGISTER VALUES

(75) Inventors: Michael Gottlieb Jensen, Holte (DK); Morten Stribaek, Frederiksberg (DK)

(73) Assignee: MIPS Technologies, Inc., Mountain View, CA (US)

( * ) Notice: Subject to any disclaimer, the term of this patent is extended or adjusted under 35 U.S.C. 154(b) by 552 days.

(21) Appl. No.: 09/702,112

(22) Filed: Oct. 30, 2000

(51) Int. Cl.
 *G06F 9/40* (2006.01)
(52) U.S. Cl. .................. 712/209; 712/227; 712/229
(58) Field of Classification Search ............... 712/209, 712/227, 229, 43
See application file for complete search history.

(56) References Cited

U.S. PATENT DOCUMENTS

| | | |
|---|---|---|
| 3,543,245 A | 11/1970 | Nutter |
| 3,631,405 A | 12/1971 | Hoff et al. |
| 3,794,980 A | 2/1974 | Cogar et al. |
| 3,811,114 A | 5/1974 | Lemay et al. |
| 3,840,861 A | 10/1974 | Amdahl et al. |
| 3,949,372 A | 4/1976 | Brioschi |
| 3,983,541 A | 9/1976 | Faber et al. |
| 4,068,303 A | 1/1978 | Morita |
| 4,077,058 A | 2/1978 | Appell et al. |
| 4,084,235 A | 4/1978 | Hirtle et al. |
| 4,110,822 A | 8/1978 | Porter et al. |
| 4,149,244 A | 4/1979 | Anderson et al. |
| 4,229,790 A | 10/1980 | Gilliland et al. |
| 4,274,138 A | 6/1981 | Shimokawa |
| 4,285,040 A | 8/1981 | Carlson et al. |
| 4,295,193 A | 10/1981 | Pomerene |
| 4,432,056 A | 2/1984 | Aimura |
| 4,456,954 A | 6/1984 | Bullions, III et al. |
| 4,463,342 A | 7/1984 | Langdon |
| 4,467,409 A | 8/1984 | Potash et al. |
| 4,488,143 A | 12/1984 | Martin |

(Continued)

FOREIGN PATENT DOCUMENTS

CA      990394      6/1976

(Continued)

OTHER PUBLICATIONS

IBM Technical Disclosure Bulletin, Patchable Read-Only Storage and Other Patchable Functions, Nov. 1, 1984, V 27, I 6,pp. 3496-3499.*

(Continued)

*Primary Examiner*—Richard L. Ellis
(74) *Attorney, Agent, or Firm*—Sterne, Kessler, Goldstein & Fox P.L.L.C.

(57) ABSTRACT

An apparatus and method are provided that enable a multiple instruction set architecture (ISA) central processing unit (CPU) to distinguish between different program instructions corresponding to different ISAs during execution of a multiple-ISA application program. The apparatus allows the multiple-ISA CPU to select a particular ISA decoding mode corresponding to a program instruction. The program instruction is located at an address within an address space of the multiple-ISA CPU. The apparatus includes a plurality of boundary address registers and ISA mode selection logic. The plurality of boundary address registers can be dynamically loaded to partition the address space into a plurality of address ranges, where each of the plurality of address ranges corresponds to each of a plurality of ISA decoding modes. The ISA mode selection logic is coupled to the plurality of boundary address registers. The ISA mode selection logic receives the particular address, and compares it against the plurality of address ranges to determine the particular ISA decoding mode for the particular program instruction.

36 Claims, 7 Drawing Sheets

U.S. PATENT DOCUMENTS

| | | | |
|---|---|---|---|
| 4,507,728 A | 3/1985 | Sakamoto et al. | |
| 4,575,797 A | 3/1986 | Gruner et al. | |
| 4,603,399 A * | 7/1986 | Cheek et al. | 711/202 |
| 4,685,080 A | 8/1987 | Rhodes, Jr. et al. | |
| 4,724,517 A | 2/1988 | May | |
| 4,727,480 A | 2/1988 | Albright et al. | |
| 4,774,652 A | 9/1988 | Dhuey et al. | |
| 4,777,594 A | 10/1988 | Jones et al. | |
| 4,782,441 A | 11/1988 | Inagami et al. | |
| 4,782,443 A | 11/1988 | Matsumoto | |
| 4,799,242 A | 1/1989 | Vermeulen | |
| 4,802,119 A * | 1/1989 | Heene et al. | 714/7 |
| 4,814,975 A | 3/1989 | Hirosawa et al. | |
| 4,835,734 A | 5/1989 | Kodaira et al. | |
| 4,839,797 A | 6/1989 | Katori et al. | |
| 4,868,740 A | 9/1989 | Kagimasa et al. | |
| 4,876,639 A | 10/1989 | Mensch, Jr. | |
| 4,992,934 A | 2/1991 | Portanova et al. | |
| 5,031,096 A | 7/1991 | Jen et al. | |
| 5,091,846 A | 2/1992 | Sachs et al. | |
| 5,115,500 A | 5/1992 | Larsen | |
| 5,132,898 A | 7/1992 | Sakamura et al. | |
| 5,193,158 A | 3/1993 | Kinney et al. | |
| 5,241,636 A | 8/1993 | Kohn | |
| 5,255,379 A | 10/1993 | Melo | |
| 5,280,593 A | 1/1994 | Bullions, III et al. | |
| 5,307,504 A | 4/1994 | Robinson et al. | |
| 5,327,566 A | 7/1994 | Forsyth | |
| 5,335,331 A | 8/1994 | Murao et al. | |
| 5,339,422 A | 8/1994 | Brender et al. | |
| 5,355,460 A | 10/1994 | Eickemeyer et al. | |
| 5,420,992 A | 5/1995 | Killian et al. | |
| 5,430,862 A | 7/1995 | Smith et al. | |
| 5,438,668 A | 8/1995 | Coon et al. | |
| 5,438,672 A | 8/1995 | Dey | |
| 5,463,700 A | 10/1995 | Nakazawa | |
| 5,467,134 A | 11/1995 | Laney et al. | |
| 5,481,684 A | 1/1996 | Richter et al. | |
| 5,481,693 A | 1/1996 | Blomgren et al. | |
| 5,506,974 A | 4/1996 | Church et al. | |
| 5,517,664 A | 5/1996 | Watanabe et al. | |
| 5,519,873 A | 5/1996 | Butter et al. | |
| 5,522,086 A | 5/1996 | Burton et al. | |
| 5,542,059 A | 7/1996 | Blomgren | |
| 5,546,552 A | 8/1996 | Coon et al. | |
| 5,568,646 A | 10/1996 | Jaggar | |
| 5,574,873 A | 11/1996 | Davidian | |
| 5,574,887 A | 11/1996 | Fitch | |
| 5,574,927 A | 11/1996 | Scantlin | |
| 5,574,928 A | 11/1996 | White et al. | |
| 5,577,200 A | 11/1996 | Abramson et al. | |
| 5,598,546 A | 1/1997 | Blomgren | |
| 5,619,665 A | 4/1997 | Emma | |
| 5,619,666 A | 4/1997 | Coon et al. | |
| 5,632,024 A | 5/1997 | Yajima et al. | |
| 5,638,525 A | 6/1997 | Hammond et al. | |
| 5,652,852 A | 7/1997 | Yokota | |
| 5,685,009 A | 11/1997 | Blomgren et al. | |
| 5,732,234 A | 3/1998 | Vassiliadis et al. | |
| 5,740,461 A | 4/1998 | Jaggar | |
| 5,745,058 A | 4/1998 | Auerbach et al. | |
| 5,751,932 A | 5/1998 | Horst et al. | |
| 5,758,115 A | 5/1998 | Nevill | |
| 5,764,994 A | 6/1998 | Craft | |
| 5,774,686 A | 6/1998 | Hammond et al. | |
| 5,781,750 A | 7/1998 | Blomgren et al. | |
| 5,794,010 A | 8/1998 | Worrell et al. | |
| 5,796,973 A | 8/1998 | Witt et al. | |
| 5,828,859 A | 10/1998 | Tanihira et al. | |
| 5,829,012 A * | 10/1998 | Marlan et al. | 711/102 |
| 5,854,913 A | 12/1998 | Goetz et al. | |
| 5,867,681 A | 2/1999 | Worrell et al. | |
| 5,867,682 A | 2/1999 | Witt et al. | |
| 5,896,519 A | 4/1999 | Worrell | |
| 5,905,893 A | 5/1999 | Worrell | |
| 5,948,112 A | 9/1999 | Shimada et al. | |
| 5,954,830 A | 9/1999 | Ternullo, Jr. | |
| 5,982,459 A | 11/1999 | Fandrianto et al. | |
| 6,012,138 A | 1/2000 | Worrell | |
| 6,021,265 A | 2/2000 | Nevill | |
| 6,219,774 B1 | 4/2001 | Hammond et al. | |
| 6,266,765 B1 | 7/2001 | Horst | |
| 6,272,620 B1 | 8/2001 | Kawasaki et al. | |
| 6,631,460 B1 | 10/2003 | Morris et al. | |
| 6,651,160 B1 | 11/2003 | Hays | |
| 2001/0021970 A1 | 9/2001 | Hotta et al. | |
| 2004/0054872 A1 | 3/2004 | Nguyen et al. | |

FOREIGN PATENT DOCUMENTS

| | | |
|---|---|---|
| EP | 0 073 424 A2 | 3/1983 |
| EP | 0 109 567 A2 | 5/1984 |
| EP | 0 169 565 A2 | 1/1986 |
| EP | 0 199 173 A2 | 10/1986 |
| EP | 0 264 215 A2 | 4/1988 |
| EP | 0 272 198 A2 | 6/1988 |
| EP | 0 324 308 A2 | 7/1989 |
| EP | 0 239 081 B1 | 9/1995 |
| EP | 0 449 661 B1 | 11/1995 |
| EP | 0 368 332 B1 | 9/1997 |
| GB | 2 016 755 A | 9/1979 |
| GB | 2 284 492 A | 6/1995 |
| GB | 2 289 353 A | 11/1995 |
| GB | 2 290 395 A | 12/1995 |
| WO | WO 95/30187 | 11/1995 |
| WO | WO 95/30188 A1 | 11/1995 |
| WO | WO 96/24895 A1 | 8/1996 |

OTHER PUBLICATIONS

IBM Technical Disclosure Bulletin, Patch RAM Load Technique, Nov. 1, 1984, V 27, I 6, pp. 3597-3598.*

IBM Technical Disclosure Bulletin, Microcode Memory Changes, Jun. 1, 1978, V 21, I 1, pp. 341-342.*

Tanenbaum, Andrew S., Structured Computer Organization, Prentice-Hall, Inc., 1984, pp. 10-12.*

Turley, J., "LSI's TinyRisc Core Shrinks Code Size: Code-Compaction Technique Squeezes MIPS Instructions Into 16 Bits," Microprocessor Report, Microdesign Resources, Oct. 28, 1996, pp. 40-43.

Sweetman, D., *See MIPS Run*, Morgan Kaufmann Publishers, Inc. ISBN 1-55860-410-3, 1999, pp. vii-xiv and 423-425.

User's Manual $V_R$4121™ 64/32-Bit Microprocessor, NEC Corporation, 1998, pp. 1-19 and 103-131.

Bandyopadhyay, A. and Zheng, Y.F., "Combining Both Micro-Code And Hardwired Control In RISC," 5 pages, (published in ACM SIGARCH Computer Architecture News, vol. 15, Issue 4, pp. 11-15 (Sep. 1987).

Bursky, D., "Software-Efficient RISC Core Trims System-Memory Needs," Reprinted from *Electronic Design*, Penton Publishing, Inc., 3 pages (Mar. 20, 1995).

Hayashi, T. et al., "A 5.6-MIPS Call-Handling Processor for Switching Systems," *IEEE Journal of Solid-State Circuits*, vol. 24, No. 4, IEEE, pp. 945-950 (Aug. 1989).

"High Performance Dual Architecture Processor," *IBM Technical Disclosure Bulletin*, vol. 36, No. 2, IBM Corp., pp. 231-234 (Feb. 1993).

*Intel486™ Microprocessor Family Programmer's Reference Amnual*, Intel Corporation, 1992, pp. 23-5, 23-9, and 23-6.

McNeley, K.J. and Milutinovic, V.M., "Emulating a Complex Instruction Set Computer with a Reduced Instruction Set Computer," *IEEE Micro*, IEEE, pp. 60-72 (Feb. 1987).

U.S. Appl. No. 09/702,115, inventors Jensen, M., et al., filed Oct. 30, 2000 (not published) (71 pages).

U.S. Appl. No. 10/066,475, inventor Edward Colles Nevill, filed Feb. 1, 2002 (based on U.S. Pat. No. 6,021,265, issued Feb. 1, 2000) (9 pages).

Preliminary Amendment, filed Feb. 1, 2002, in U.S. Appl. No. 10/066,475, inventor Edward Colles Nevill, filed Feb. 1, 2002 (based on U.S. Pat. No. 6,021,265, issued Feb. 1, 2000) (15 pages).

Case, Brian, "ARM Architecture Offers High Code Density: Non-traditional RISC Encodes Many Options in Each Instruction," *Microprocessor Report*, vol. 5 No. 23, pp. 11-14 (Dec. 18, 1991).

Cobb, Paul, "TinyRISC: a MIPS-16 embedded CPU core," Presentation for Microprocessor Forum, 13 slides (7 pages) (Oct. 22-23, 1996).

Gwennap Linley, "VLIW: The Wave of the Future?: Processor Design Style Could Be Faster, Cheaper Than RISC," *Microprocessor Report*, vol. 8, No. 2, pp. 18-21 (Feb. 14, 1994).

Kurosawa, K., et al., "Instruction Architecture For a High Performance Integrated Prolog Processor IPP," *Logic Programming: Proceedings of the Fifth International Conference and Symposium* (Aug. 15-19, 1988), MIT Press, Cambridge, MA, vol. 2, pp. 1506-1530 (1988).

LSI TinyRisc Development (visited Apr. 24, 2001), at <http://www.redhat.com/support/manuals/gnupro99rl/6_embed/emb09.html>, 13 pages.

NEC Data Sheet, MOS Integrated Circuit, uPD30121, VR4121 64-/32-Bit Microprocessor (Copyright NEC Electronics Corporation 2000) (76 pages).

NEC User's Manual, VR4100 Series™, 64-/32-Bit Microprocessor Architecture, pp. 1-11 and 54-83 (Chapter 3) (Copyright NEC Corporation 2002).

Ross, Roger, "There's no risk in the future for RISC," *Computer Design*, vol. 28, No. 22, pp. 73-75 (Nov. 13, 1989).

*MIPS32® Architecture for Programmers Volume IV-a: The MIPS16e™ Application-Specific Extension to the MIPS32® Architecture*, MIPS Technologies, Inc., Doc. No. MD00076, Revision 2.50, pp. i-vi and 1-154, (Copyright 2001-2003, 2005).

*MIPS64® Architecure for Programmers Volume IVra: The MIPS16e™ Application-Specific Extension to the MIPS64® Architecture*, MIPS Technologies, Inc., Doc. No. MD00077, Revision 2.50, pp. i-viii and 1-200, (Copyright 2005).

\* cited by examiner

Optimization of Application Program Requirements Using Multiple ISAs

Decoding and Executing Multiple-ISA Application Programs

CHANGING INSTRUCTION SET ARCHITECTURE MODE BY COMPARISON OF CURRENT INSTRUCTION EXECUTION ADDRESS WITH BOUNDARY ADDRESS REGISTER VALUES

CROSS-REFERENCE TO RELATED APPLICATIONS

This application is related to copending U.S. patent application Ser. No. 09/702,115, filed on Oct. 30, 2000, entitled Translation Lookaside Buffer for Selection of ISA Mode, by common inventors, and having the same assignee as this application.

BACKGROUND OF THE INVENTION

1. Field of the Invention

This invention relates in general to the field of instruction processing in computer systems, and more particularly to an apparatus and method in a CPU for executing application programs that consist of program instructions belonging to different instruction set architectures.

2. Description of the Related Art

A first-generation computer was only capable of executing programs that were encoded using a unique set of programming instructions. The unique set of programming instructions, or instruction set architecture (ISA) was to be used to develop application programs for execution only on that first-generation computer. Because of this constraint, system designers typically selected a particular computer for use as a system central processing unit (CPU) based upon its hardware characteristics (e.g., speed, power consumption, etc.) in conjunction with its instruction set's ability to implement certain critical functions within a system design. Once the CPU was selected, the system application programs were developed using instructions from the CPU's instruction set and the application programs were exclusively executed on the selected CPU. If system designers desired to upgrade the system's CPU to a more powerful processor, then they were required to recode the system application programs using instructions from the instruction set of the more powerful processor. In the early days of software engineering, this was not a significant encumbrance, primarily because there were not very many application programs in existence, and those that had been developed were not very complex.

Because a CPU can be easily programmed to perform a wide variety of functions within a system design, within just a few years the number of CPUs and application programs in the marketplace increased exponentially. In parallel with these events, technological advances in the integrated circuit design and fabrication arts began to release a steady stream of more powerful and complex CPU designs. And as these more powerful and complex CPU designs were exploited, a number of modification and upgrade mistakes were made as a result of recoding existing application programs. So, hardware and software designers were required to focus on preserving and reusing a substantial amount of code that had already been developed and tested for use with particular CPU designs. Consequently, as newer CPUs were introduced, in addition to implementing a whole "new" set of instructions, the CPUs retained the capability to execute applications that were coded with "old" instructions. Typically, this ability to execute multiple instruction sets was bounded by a particular manufacturer's line of products. For example, Digital Equipment Corporation produced a VAX11 CPU that supported newer VAX11 instructions and older PDP11 instructions.

Today, the number of application programs and their complexity continues to grow. In addition to this growth, another factor has provided both a motivation for innovation as well as a cause for concern. That is, the number and diversity of instructions sets that are available today for use in programming applications has resulted in designers often first choosing a specific instruction set for implementation of a system design. Following this selection, one of many CPUs is selected that implements the specific ISA. In fact, many present day processors implement more than one ISA. These processors are also capable of executing an application program consisting of program modules that are coded by instructions from different ISAs, i.e., a multiple-ISA application program. Accordingly, a system designer can specify a specific ISA for encoding a specific set of program functions (e.g., signal processing algorithms) and select other ISAs for encoding other types of program functions (e.g., operating system functions, I/O functions, general purpose functions).

Program instructions are represented as binary values. When a particular program instruction is fetched from memory and provided to a multiple-ISA CPU for execution, the CPU must have some way of knowing which set of instruction decoding rules to apply in order to correctly process a program instruction that has been fetched from a multiple-ISA application program.

One approach to indicating the ISA mode for program instructions is to encode the ISA mode as an additional field of the instruction. But this approach is very memory inefficient because additional memory bits are required for each instruction in a program. A more workable approach, employed by present day multi-ISA CPUs, recognizes the fact that adjacent program instructions in a multiple-ISA application program tend to be from the same ISA. Hence, the technique that is used today to indicate the ISA mode of particular instruction streams is to insert a special program instruction into the instruction stream that directs the CPU to switch ISA modes when instructions from a different ISA are programmed. For example, when a CPU is executing a program module consisting of ISA 1 instructions, and the module wishes to transfer program control to a subroutine comprised of ISA 3 instructions, prior to transferring control to the subroutine, an ISA 1 mode switch instruction must be executed that directs the CPU to switch to ISA 3 mode. Following this, program control is transferred to the subroutine that consists of ISA 3 instructions.

The technique described above comes in various forms. Hammond et al., in U.S. Pat. No. 5,638,525 and U.S. Pat. No. 5,774,686, discusses a "switch" instruction that directs a multi-ISA CPU to perform an ISA mode switch and to transfer program control. Jaggar, in U.S. Pat. No. 5,568,646 and U.S. Pat. No. 5,740,461, discusses the use of mode bits within an internal CPU register to signal a specific ISA mode. Under Jaggar's approach, a calling module first executes an instruction to set the mode bits in the internal CPU register to indicate the ISA mode of a module that is to be called. Following this, control is transferred to the called module. Nevill, in U.S. Pat. No. 5,758,115, and U.S. Pat. No. 6,021,265, describes the use of predetermined indicator bits within a program counter register for signaling ISA modes. The program counter register within a CPU carries both the address for the instruction that is to be fetched from memory and the predetermined bits indicating the ISA mode of the instruction.

All of the above techniques have one shortcoming in common: there is an interdependency that exists between components of a multi-ISA application program that extends beyond the simple transfer of program control. More specifically, a transferring component must know the particular ISA mode of a component to which flow is to be transferred in order to direct the CPU to switch ISA modes. One skilled in the art will appreciate that this is a difficult approach for use in a complex application program environment because each time a given component of a multiple-ISA application program is encoded into a different ISA mode, it forces a designer to modify all of the components that are referenced by the given component as well, thus increasing the chances for bugs to enter into a system design.

Years ago however, Larsen, in U.S. Pat. No. 5,115,500, proposed an approach for enabling a CPU to switch ISA modes during the execution of a multiple-ISA application program that did not require the insertion of a mode switch instruction into the flow of a transferring component. Larsen associated a program instruction's address in the CPU's address space with one of several ISA modes. In essence, Larsen used the upper bits of the program instruction's address to indicate its ISA mode. Hence, all instructions corresponding to a specific ISA mode were stored in one or more memory segments that corresponded to that specific ISA mode. Although Larsen's technique addressed the issue of inserting mode switch instructions into an application program, his technique for using the upper bits of a fetched instruction's address as an indication of the instruction's ISA mode is restrictive because it requires that the CPU's address space be partitioned into fixed and equal-sized segments. And fixed, equal-sized segments do not represent the distribution of components according to different ISA modes within a multiple-ISA application program. Larsen's technique for switching ISA modes is inflexible and memory inefficient.

Therefore, what is needed is an apparatus that enables a multiple-ISA CPU to select a particular ISA mode for processing a particular program instruction that does not employ fixed and inflexible segments within the CPU's address space.

In addition, what is needed is an ISA mode selection apparatus that provides for execution of a multiple-ISA application program, where a given component of the application program can be modified to a different ISA mode without requiring that all components referenced by the given component be modified as well.

Furthermore, what is needed is an apparatus for executing a multiple-ISA application program on a CPU that eliminates the need to insert special mode switch instructions into the flow of a first component of the application program in order for the first component to transfer program control to a second component that is encoded by instructions from a different ISA mode.

Moreover, what is needed is a method for executing multiple-ISA application programs that reduces the number of changes required to the application program when one of its subcomponents is modified to employ instructions from a different ISA.

SUMMARY

The present invention provides a technique for encoding and executing multiple-ISA application programs that gives system designers the flexibility to dynamically configure the address space of a multiple-ISA CPU to meet the unique ISA mode storage requirements of components within the programs. In addition, the present invention obviates the need for inserting special mode switch instructions into the program flow of the application programs to effect a mode switch during their execution. Furthermore, the present invention advantageously allows designers to independently change a particular component of the application program to a different ISA without requiring that they modify all of the components that are referenced by the particular component as well.

In one embodiment, Instruction Set Architecture (ISA) selection logic within a CPU is provided for selecting an ISA decoding mode corresponding to a program instruction, where the program instruction is located at an address within an address space of the multiple-ISA CPU. The selection logic includes a plurality of boundary address registers and ISA mode selection logic. The plurality of boundary address registers store boundary addresses that partition the address space into a plurality of address ranges corresponding to the plurality of ISA decoding modes. The ISA mode selection logic is coupled to the plurality of boundary address registers. The ISA mode selection logic receives the address, and compares the address to determine the ISA decoding mode for the program instruction.

One aspect of the present invention features an ISA mode selection apparatus in a CPU, where the CPU is configured to execute an application program having program instructions corresponding to one or more ISAs. The ISA mode selection apparatus has a boundary address register file and an ISA mode controller. The boundary address register file maps ISA modes to address ranges within the CPU's address space. The ISA mode controller is coupled to the boundary address register file. The ISA mode controller designates a specific ISA mode that is to be used to execute a specific program instruction, where the specific program instruction is located at an address within the CPU's address space. The ISA mode controller includes address evaluation logic that determines a specific address range within which the address lies.

Another aspect of the present invention contemplates a CPU for executing a multiple-ISA program. The CPU includes ISA mode selection logic, ISA mode boundary address registers, and an instruction decoder. The ISA mode selection logic provides a first ISA mode that corresponds to a first program instruction, where the first program instruction is fetched from a first address in memory. The ISA mode boundary address registers are coupled to the ISA mode selection logic. The ISA mode boundary address registers partition the memory into address ranges, where one of a plurality of ISA modes is mapped to each of the address ranges, and where the first address lies within one of the address ranges. The instruction decoder is coupled to the ISA mode selection logic. The instruction decoder receives the first ISA mode, and decodes the first instruction according to the first ISA mode.

Yet another aspect of the present invention provides a computer program product for use with a computing device. The computer program product includes a computer usable medium, having computer readable program code embodied in the medium, for causing a CPU to be described, the CPU being capable of executing a multiple-ISA application program. The computer readable program code includes first program code and second program code. The first program code provides boundary address registers, configured to partition an address space of said CPU into address ranges, where each address range corresponds to an associated ISA mode. The second program code provides mode selection logic, configured to receive a particular address corresponding to a particular program instruction, and configured to compare the particular address against the address ranges to determine a particular ISA mode for processing the particular program instruction.

A further aspect of the present invention contemplates a method in a CPU for selecting a particular ISA mode during execution of an application program, where the application program has program instructions according to a plurality of instruction set architectures. The method includes partitioning an address space of the CPU into address ranges, the address ranges being designated by contents of a boundary register file; mapping each of the address ranges to each of a plurality of ISA modes; and selecting the particular ISA mode for processing of the program instruction according to mapping.

BRIEF DESCRIPTION OF THE DRAWINGS

These and other objects, features, and advantages of the present invention will become better understood with regard to the following description, and accompanying drawings where.

DETAILED DESCRIPTION

In light of the above background on the techniques used by present day CPUs to switch between different ISA modes during the execution of a multiple-ISA application program, several related art examples will now be discussed with reference to FIGS. 1–3. These examples point out the problems associated with developing and executing multiple-ISA application programs for execution by today's processors. More particularly, present day multi-ISA programming/execution techniques either partition a processor's address space into fixed and equal-sized segments, or they preclude an individual component (i.e., module, subroutine, task, etc.) of a multiple-ISA application program from being changed from one ISA to the next, without necessitating that all components (i.e., both subordinate and dominant components) referenced by the individual component be modified as well. Following this discussion, a detailed description of the present invention will be provided with reference to FIGS. 4 through 7. The present invention prevails over the limitations of present day multi-ISA approaches by providing an apparatus and method for selecting ISA decode/execution modes in a CPU in accordance with a set of address boundaries stored in an internal register file, thereby allowing ISA decode/execution modes for program instructions to be selected based solely upon the location in memory of a program instruction. The capability of specifying address boundaries within the register file moreover enables designers to configure variable-sized ISA mode segments within the processor's address space to tailor memory storage requirements for individual program components comprising each of the ISA modes.

Figure 1:
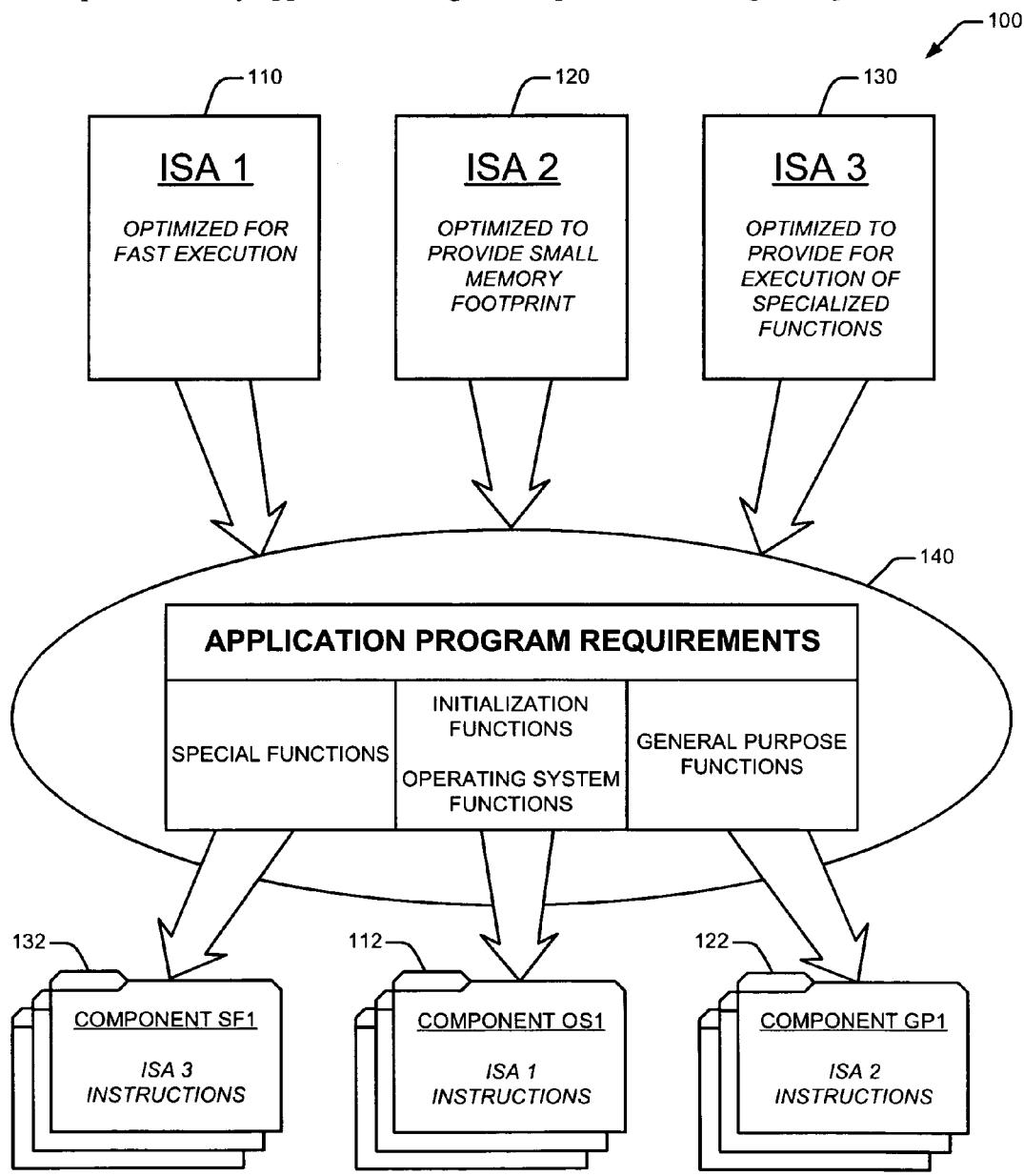
FIG. 1 is a diagram illustrating how various components of a related art application program may be generated according to different instruction set architectures, where selection of a particular instruction set architecture for a particular component is based upon desirable characteristics of the particular instruction set architecture.

Now referring to FIG. 1, a diagram 100 is presented illustrating how various components 112, 122, 132 of a related art application program can be generated according to different instruction set architectures (ISAs) 110, 120, 130, where selection of a particular instruction set architecture for a particular component is based upon desirable characteristics of the particular instruction set architecture. The diagram 100 depicts three different instruction set architectures: ISA 1 110, ISA 2 120, and ISA 3 130. In this example, program instructions from any of the three ISA's 110–130 can be applied to code components of an application program, where the application program is developed to implement a set of functional requirements 140.

At a very high level, an ISA 110, 120, 130 comprises those features of a central processing unit (CPU) or microprocessor that are essential for a designer to know. In most instances, those essential features consist of the program instructions that are used to develop application programs to run on the CPU/microprocessor along with the architecture of programmable resources within the CPU/microprocessor such as register files and special purpose functional units (e.g., floating point logic). Examples of ISAs that are well known in the art today include MIPS32, MIPS64, PowerPC, and x86.

Even though the high-level architectural features of a processor are typically prescribed by an ISA 110, 120, 130, program instructions corresponding to a specific ISA 110–130 need not necessarily be executed on a specific CPU; it is only required the program instructions execute on a CPU that conforms to the specific ISA 110–130. For instance, a program component 112, 122, 132 that is encoded using program instructions of the x86 ISA can be executed on any CPU that implements the x86 ISA. Likewise, a program component 112, 122, 132 coded with MIPS32 program instructions can be executed on any processor that conforms to the MIPS32 ISA.

In earlier years, application program designers suffered from the restriction of having to encode all of the components 112, 122, 132 of an application program with program instructions from a single instruction set architecture 110, 120, 130. For example, an industrial control application program developed to execute on a PDP11 CPU comprised program instructions taken only from the PDP11 ISA. Any change in the CPU resulted in a requirement to recode all of the components of the application program using program instructions that conformed to the ISA of the new CPU. Consequently, selecting a specific ISA 110, 120, 130 for use in an application program was generally considered by designers to be at the same priority level as selection of a specific CPU for execution of the application program. CPUs and their corresponding instruction set architectures used to be very tightly coupled.

As technology advanced, system designers noted that a substantial amount of application code could be reused following upgrade of a system's CPU because, although the CPU had changed, the application program requirements 140 had not changed. But the existing application code could not be reused in a practical sense because the application program needed to be regenerated using program instructions from the ISA 110, 120, 130 corresponding to the upgraded CPU. Regenerating application code into a different ISA 110, 120, 130 provided an opportunity for the entry of inadvertent errors at each upgrade instance. Developing an application program in a high-level programming language (e.g., FORTRAN, PASCAL, C) lessened the probability for errors to enter into a system design, however, the possibility for errors to occur still persisted. This is because porting an application program to a different ISA 110, 120, 130 requires that all of the program's components be recompiled. Consequently, to minimize this error probability, system designers began to focus on minimizing the number of changes that software must undergo to be ported to a different CPU.

During the late 1970's, CPU designers began to embrace the concept of minimizing the changes to existing software by providing means for executing old code 112, 122, 132 on a new CPU in addition to providing for the execution of new code 112, 122, 132 on the new CPU. What this means is that provisions were made in a new CPU design to implement an older ISA 110, 120, 130 in addition to providing a newer ISA 110, 120, 130. One skilled in the art will remember that Digital Equipment Corporation's VAX11 CPUs provided a capability to execute applications written in program instructions according to 1) the newer VAX ISA, or 2) the older PDP11 ISA.

In more recent years, however, CPUs have been developed that are capable of non-exclusively executing application programs consisting of program instructions taken from more than one ISA 110, 120, 130. The capability to execute a multiple-ISA application program is a very powerful feature because it provides application program designers with the flexibility to select a specific ISA 110, 120, 130 to implement specific requirements 140 of an application program that exploits desirable characteristics of the specific ISA 110, 120, 130. FIG. 1 shows an exemplary set of application program requirements 140 that are effectively implemented into a multiple-ISA application program consisting of program instructions taken from three ISAs 110, 120, 130, where each of the three ISAs 110, 120, 130 possess different desirable properties.

In this example, program instructions and resources according to ISA 1 110 are optimized for fast execution on a conforming CPU, however, ISA 1 program instructions are long and require a lot of memory to store. Program instructions and resources according to ISA 2 120 are optimized to require a small amount of memory, but execution of ISA 2 encoded functions on a conforming CPU is much slower than execution of the same functions when encoded using ISA 1 110 instructions. Program instructions and resources according to ISA 3 130 are optimized to implement certain special functions (e.g., Fast Fourier Transform), yet other functions encoded by ISA 3 instructions require a lot of storage space and execute much slower than they would were they to be encoded by instructions from ISA 1 110 or ISA 2 120.

The set of requirements 140 for the application program of FIG. 1 depicts three general categories of functions: special functions, that are most effectively implemented using ISA 3 program instructions; initialization and operating system functions, that typically must exhibit low latencies and are therefore most effectively encoded using program instructions from ISA 1; and a number of remaining general purpose functions that neither require special instructions nor fast execution. The general purpose functions could perhaps be encoded using ISA 1 instructions, but in a system configuration that is memory constrained, a better approach would be to implement all of the general purpose functions using program instructions taken from ISA 2 120.

Hence, a multiple-ISA application program that satisfies the program requirements 140 shown in FIG. 1 is developed for execution on a multiple-ISA CPU by generating program components 112, 122, 132 that use instructions from each of the three ISAs 110, 120, 130. The special functions are encoded into special function components 132 using instructions from ISA 3 130. The time-critical initialization and operating system functions are implemented by generating initialization/operating system components 112 using instructions from ISA 1 110. And system memory is preserved by encoding all of the remaining general purpose functions into general purpose components 122 using instructions from ISA 2 120.

Figure 2:
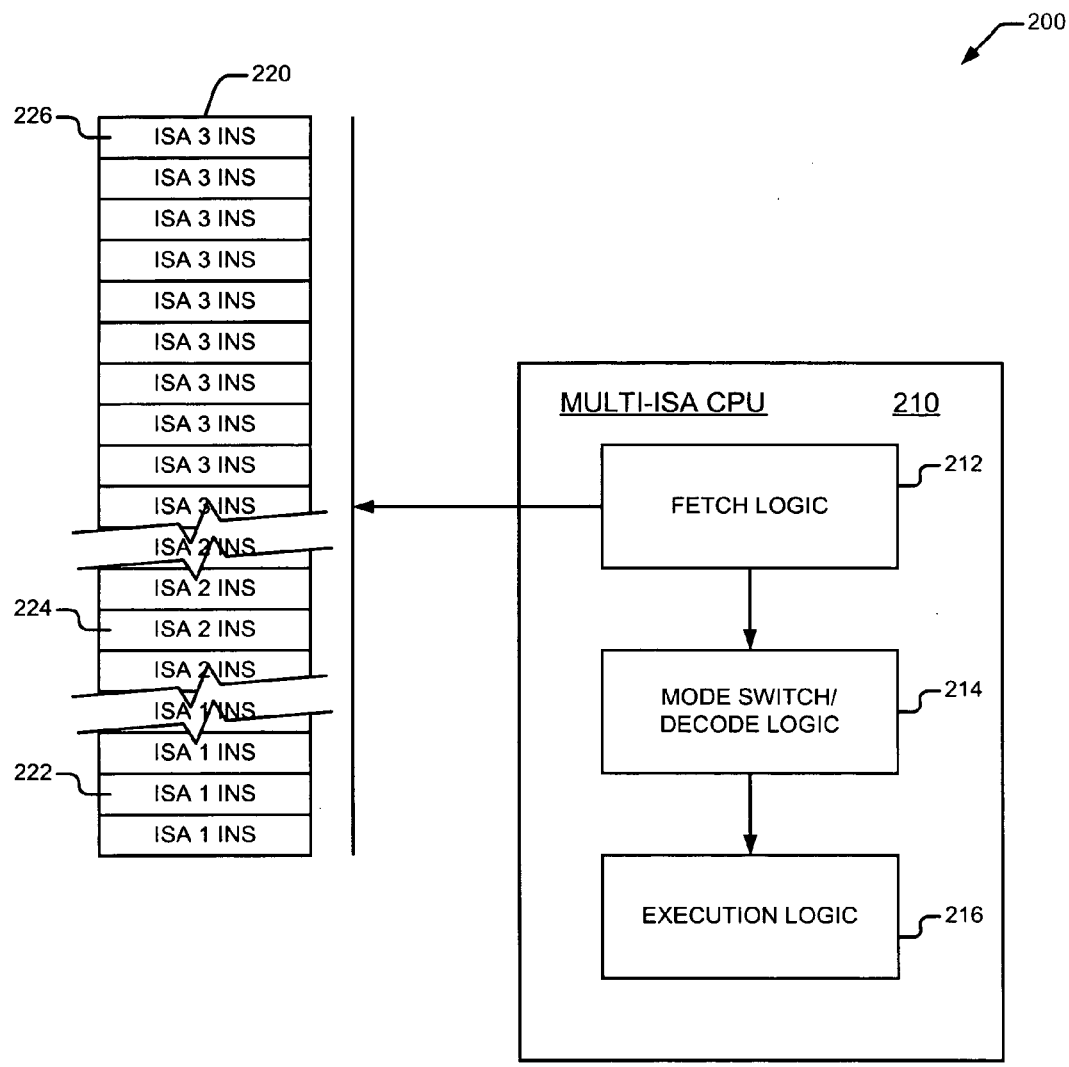
FIG. 2 is a block diagram illustrating how a related art multiple-ISA processor decodes and executes an application program consisting of program instructions taken from three different instruction set architectures.

Now referring to FIG. 2, a block diagram 200 is presented illustrating how a related art multiple-ISA processor 210 decodes and executes an application program consisting of program instructions taken from three different instruction set architectures. The block diagram 200 depicts the multiple-ISA CPU 210 that is coupled to a memory 220. The multiple-ISA processor 210 has fetch logic 212, mode switch/decode logic 214, and execution logic 216. The fetch logic 212 accesses program instructions 222, 224, 226 of the application program from addressed locations within the memory 220.

In operation, the CPU 210 executes the application program by fetching program instructions 222, 224, 226 from the memory 220 in an order that is prescribed by the application program itself. Generally speaking, the fetch logic 212 retrieves a particular instruction 222, 224, 226 from a particular address in the memory 220. The particular program instruction is provided to the mode switch/decode logic 214. The mode switch/decode logic 214 decodes the particular program instruction into control words or control signals (not shown) that direct the execution logic 216 to perform an operation prescribed by the particular program instruction. The execution logic 216 receives the control words/signals and, in turn, performs the prescribed operation. Virtually all present day processors 210 fetch program instructions 222, 224, 226 from memory 220 in sequentially ascending or sequentially descending address order. Changes in control flow of the application program are achieved through the use of control flow modification instructions, generally referred to in the art as jump instructions. Accordingly, during execution of the application program, the fetch logic 212 continues to generate sequential addresses for the retrieval of sequential program instructions 222, 224, 226 until a jump instruction is encountered. Usually, the jump instruction prescribes a target address in memory 220 that contains the next instruction to be executed following the jump instruction.

As alluded to above, the primary function performed by the mode switch/decode logic 214 is translation of a program instruction 222, 224, 226 fetched from memory 220 into associated control words/signals that direct the execution logic 216 to perform a corresponding prescribed operation. This translation, or decoding, of program instructions 222, 224, 226 is an extremely complex task that is very closely tied to the architecture of the CPU 210. If the CPU 210 is capable of implementing, or emulating, more than one ISA, then the complexity of instruction decoding becomes more complex. For example, an ISA 1 instruction 222 stored in memory 220 may very well have the same bit states as an ISA 2 instruction 224. But even though these two instructions 222, 224 are equivalent in value to the observer, because they correspond to two entirely different instruction set architectures, the two instructions 222, 224 most likely will direct the execution logic 216 to perform two entirely different operations. Decoding rules are different for each different ISA.

Since program instructions 222, 224, 226 from different instruction sets are decoded and executed according to entirely different sets of rules, the multi-ISA CPU 210 must provide a means for selecting and applying those rules during execution of the multiple-ISA application program. The selective application of ISA decoding rules is a function that is also performed by the mode switch/decode logic 214. When the fetch logic 212 provides an ISA 1 instruction 222 to the CPU 210, the mode switch/decode logic 214 must be capable of applying ISA 1 decoding mode rules so that the ISA 1 instruction 222 can be correctly decoded and executed by the CPU 210. Similarly, when the fetch logic 212 provides an ISA 2 instruction 222 or an ISA 3 instruction to the CPU 210, the mode switch/decode logic 214 must be capable of switching the CPU 210 to the proper decoding mode so that the given instruction 224, 226 can be correctly decoded and executed. A few present day techniques are available for switching ISA modes in a multiple-ISA CPU 210 during the execution of a multiple-ISA application program. These techniques are more specifically discussed with reference to FIG. 3.

Figure 3:
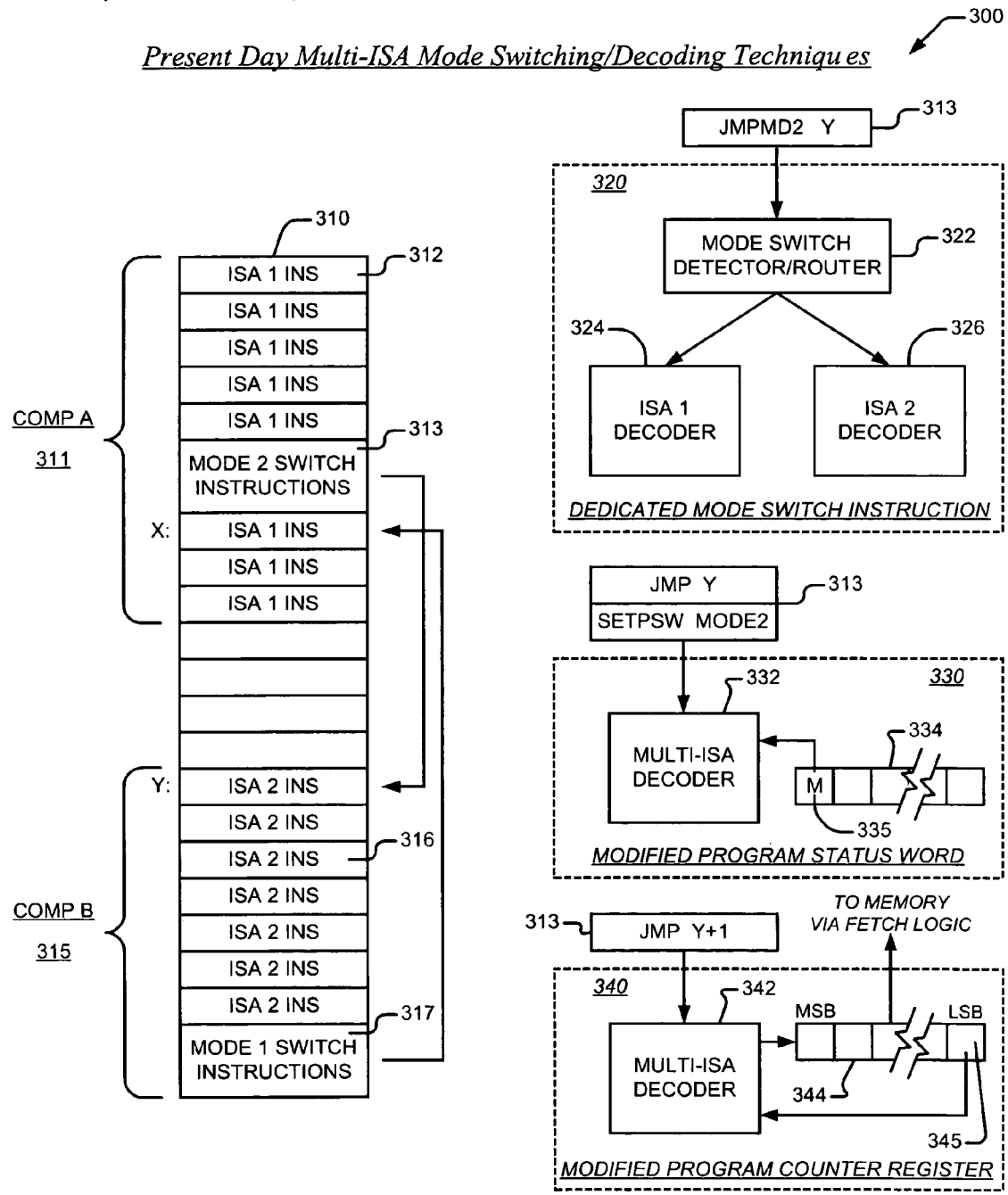
FIG. 3 is a diagram illustrating present day techniques that are used by related art processors to select ISA decoding modes when executing multiple-ISA application programs.

Referring to FIG. 3, a diagram 300 is presented illustrating three techniques used by related art processors 320, 330, 340 to select ISA decoding modes when executing multiple-ISA application programs. The diagram 300 shows relevant mode switch and decoding logic within three multi-ISA CPUs 320, 330, 340. A first CPU 320 employs a special mode switch instruction for switching between ISA modes during execution of a multiple-ISA application program. A second CPU 330 employs a technique that switches ISA modes based upon the state of a mode bit 335 within the CPU's program status word 334. A third CPU 340 reads the state of an unused bit 345 within the CPU's program counter register 344 to determine one of two ISA modes.

The diagram 300 also shows a memory 310 that contains a portion of a multi-ISA application program consisting of program instructions 312, 313, 316, 317 from two ISAs: ISA 1 and ISA 2. The portion of the application program has two components 311, 315: component A 311 and component B 315. Component A 311 is programmed using ISA 1 instructions 312 and component B 315 is encoded with ISA 2 instructions 316. In addition, each of the ISAs have instructions 313, 317 that direct a multi-ISA CPU 320, 330, 340 to switch ISA decoding modes in accordance with whatever mode switch technique is employed. In particular, the diagram 300 includes ISA 1 mode switch instructions 313 that direct the CPUs 320, 330, 340 to switch to ISA mode 2 and ISA 2 mode switch instructions 317 that direct the CPUs 320, 330, 340 to switch to ISA mode 1.

To appreciate the operational aspects of each of the three mode switch techniques, assume that during the execution of component A 311, control flow of the application program is to be transferred to component B 315 at address Y and, following execution of component B 315, control flow is to be returned to component A at address X. When component A 311 is being executed, the processors 320, 330, 340 are decoding program instructions 312 in accordance with ISA 1. And when flow is to be transferred to component B 315, the ISA 1 mode switch instructions 313 must first cause the CPUs 320, 330, 340 to switch ISA modes to mode 2 followed by a transfer of program flow to address Y. In like manner, when execution of component B 315 is complete and flow must return to component A 311, the ISA 2 mode switch instructions 317 must cause the CPUs 320, 330, 340 to switch ISA modes back to mode 1 and then cause flow to be transferred to address X. To illustrate each of the present day ISA mode switch techniques, the following paragraphs describe how each of the three processors 320, 330, 340 are directed to switch from ISA mode 1 to ISA mode 2 along with the transfer of program control to address Y.

According to the technique employed by CPU 320, an ISA 1 instruction 313, JMPMD2 Y, is executed that directs the first CPU 320 to switch to ISA mode 2 and to transfer program control to address Y. This mode switching technique is employed on Intel® x86 microprocessors and is described by Hammond et al. in U.S. Pat. No. 5,638,525 and U.S. Pat. No. 5,774,686. Hammond refers to instruction 313 as a "switch instruction" 313. Accordingly, during execution of component A 311, ISA 1 instructions 312 are fetched by the CPU 320 and a mode switch detector/router 322 routes the ISA 1 instructions 312 to an ISA 1 decoder 324. When the switch instruction 313 is fetched, the mode switch detector/router 322 detects the switch instruction 313 and routes following ISA 2 instructions 316 to an ISA 2 decoder 326. Consequently, to execute a multiple-ISA application program according to this first technique, each time that program control is transferred to a component 315 encoded with instructions from an ISA that is different from the ISA of the transferring component 311, a mode switch instruction must be programmed into the transferring component's instruction flow.

According to the mode switch technique employed by CPU 330, an instruction 313, SETPSW MODE2, is first executed that directs the second CPU 320 to set a mode bit 335 within the program status word 334, thus signaling the CPU 330 to switch to ISA mode 2. An ISA 2 jump instruction 313, JMP Y, follows in the sequence that directs the CPU to transfer program control to address Y. The use of a bit 335 or bits of a program status word 334 to accomplish ISA mode switches is described by Jaggar in U.S. Pat. No. 5,568,646 and U.S. Pat. No. 5,740,461. Accordingly, during execution of component A 311, ISA 1 instructions 312 are fetched by the CPU 330 and a multi-ISA decoder 332 monitors the state of the mode bit 335 to determine which ISA decoding rules to apply for a current instruction. When the instruction 313 is executed that modifies the mode bit 335 in the program status word 334, the multi-ISA decoder 332 detects the state of the bit 335 and begins decoding following instructions according to ISA mode 2. Hence, to execute a multiple-ISA application program according to this second technique, each time that program control is transferred to a component 315 that is encoded with instructions from an ISA that is different from the ISA of the transferring component 311, an instruction to set the mode bit 335 of the program status word 334 must be inserted into the instruction stream of the transferring component's instruction flow and the jump instruction that actually causes flow to be transferred must be encoded according to the ISA mode of the transferred component 315. One skilled in the art will appreciate that it would not be recommended to place the mode bit instruction 313 as the first instruction in the transferred program component 315 flow because the mode bit instruction 313 must be encoded according to the ISA mode of the transferring component 311, and in an application program comprising several ISA modes, the transferred component 315 could be called by components encoded in more than one ISA.

According to the mode switch technique employed by CPU 340, a modified jump instruction 313, JMP Y+1, is executed that directs the third CPU 340 to switch to ISA mode 2 and to transfer program control to address Y. In particular, a bit 345 or bits of a program counter register 344 are employed to indicate which ISA mode is to be used by a multi-ISA decoder 342. Like the technique used by CPU 330, the decoder 342 of CPU 340 monitors the state of bit 345 maintained in program counter register 344 to determine which ISA mode is to be used. Nevill describes this approach for mode switching in U.S. Pat. No. 5,578,115 and U.S. Pat. No. 6,021,265. Nevill refers to the type of instruction 313 that modifies the contents of the program counter register 344 to direct a mode switch as a "veneer" 313. According to Nevill, the bit 345 or bits that are employed to signal the decoder 342 to switch modes are either not provided to its memory system or the system is configured to ignore such signaling information. Accordingly, during execution of component A 311, ISA 1 instructions 312 are fetched by the CPU 340 and provided to a multi-ISA decoder 342. When the ISA 1 veneer 313 is executed, the decoder 342 detects state of the bit 345 and switches to ISA 2 mode. It is noted that according to Nevill's scheme, jump target addresses must be manipulated in a calling routine 311 to ensure proper decoding of instructions 316 in a called routine 315. Hence, according to the third technique, the calling component 311 must ensure that the contents of the program counter register 344 are manipulated to properly indicate the ISA mode of the called component 315. One skilled in the art will appreciate as well that manipulation of the mode switch bit 345 in the program counter register 344 by a first ISA 2 instruction 316 in the called component 315 would not be recommended for the same reasons as put forth in the discussion with reference to the program status word technique.

It is significant to note that under any of the mode switching techniques illustrated by the examples of FIG. 3, it is impossible to independently generate program components 311, 315 in a multiple-ISA application program. In all cases a transferring component 311 must have knowledge of the ISA mode of a transferred component 315 because a mode switch is accomplished by programming a mode switch instruction 313 within the instruction flow of the transferring component 311. As a result, if a designer desires to recode any component of an application program using instructions from a different ISA, then all of the components that are referenced by that component must be modified as well. This is a problem that cuts against the grain of one of the major objectives within the software engineering community, that is, to minimize the number of changes that are required when an application program is modified for reuse. More specifically, when one program component is encoded into a different ISA, changes are also required to be made in all components that are referenced by the program component in order to modify mode switch instructions so that they indicate the different ISA mode. The multi-ISA techniques discussed above open the door for errors to enter into a system design. One skilled in the art will agree that it is desirable to change only those components of an application program that truly require modifications.

Larsen, in U.S. Pat. No. 5,115,500, advocated an approach for providing independent program components in a multiple-ISA application program by using the uppermost bits of a program instruction's address as means for signaling the ISA mode of the program instruction. In the specific embodiment described by Larsen, the upper three address bits were used to determine one of two (or more) ISA decoding modes. Program components encoded according to, say, ISA 1 mode, were to be stored in a first one of eight memory segments, program components encoded according to ISA 2 mode were stored in the remaining segments (in accordance with one embodiment).

Although the technique described by Larsen is desirable from the standpoint that program components are effectively decoupled from all other referenced program components, Larsen's approach is inflexible because it requires that a CPU's address space be partitioned into fixed and equal-sized segments. Practically speaking, the distribution of instructions according to each of the ISA modes in a multi-ISA program is not uniform in any sense of the word. In fact, this distribution varies from program to program as a function of the specific requirements that are implemented and based upon the particular processor upon which the programs are executed. Larsen's equal-sized segment technique is disadvantageous because it does not allow memory space to be partitioned according to the specific needs of a multi-ISA application program.

The present invention overcomes the limitations of present day multi-ISA techniques by providing an apparatus and method for switching ISA modes during the execution of a multiple-ISA application program that eliminate the need to modify referenced components when a given component is changed to a different ISA, as well as providing for flexible partitioning of memory into ISA mode segments that can be tailored to meet the unique storage requirements of individual multiple-ISA applications. The present invention is more particularly described with reference to FIGS. 4–7.

Figure 4:
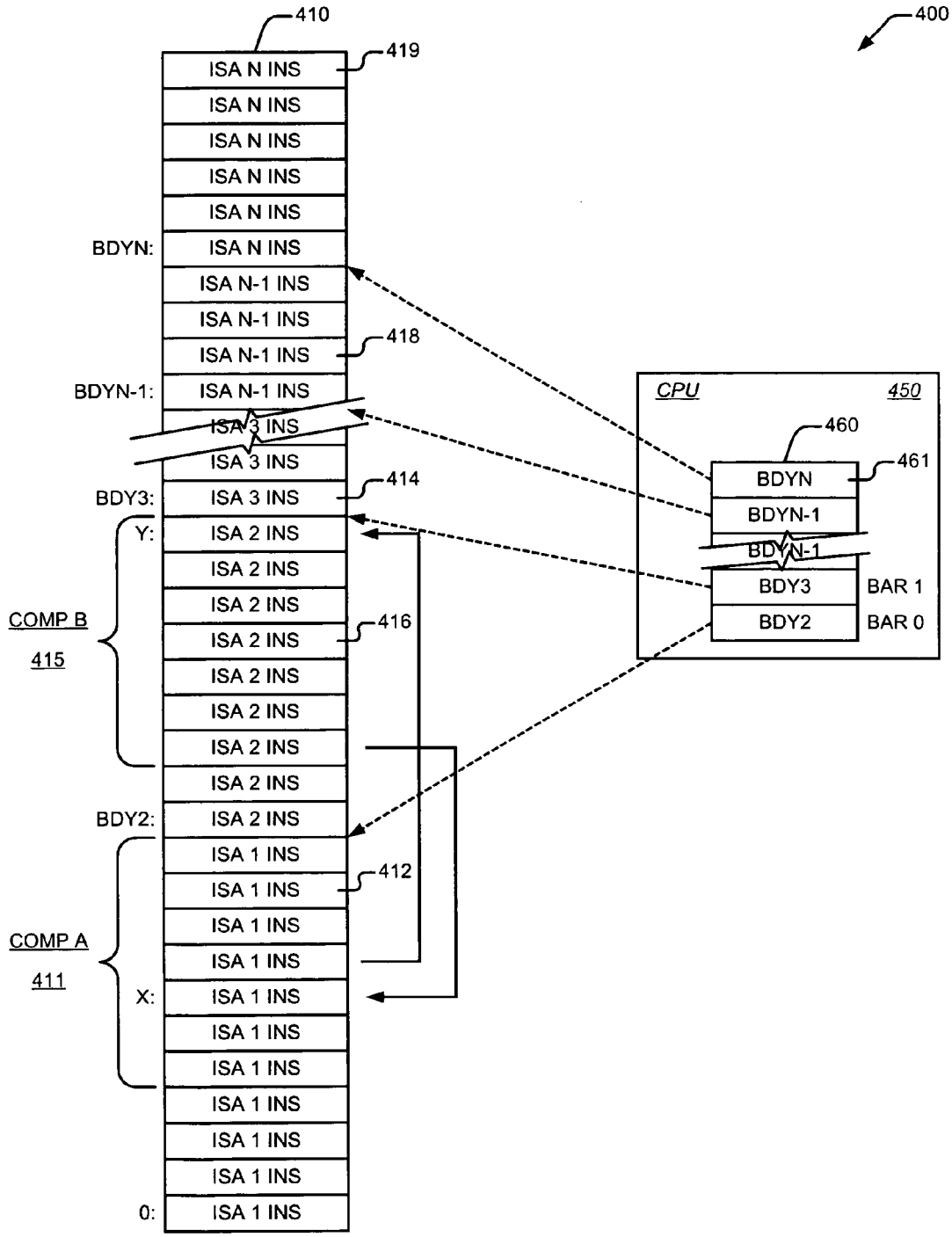
FIG. 4 is a block diagram of a portion of a multiple-ISA processor according to the present invention having a boundary address register file for selection of ISA modes.

Referring to FIG. 4, a block diagram 400 is presented illustrating a portion of a multiple-ISA processor 450 according to the present invention having a boundary address register file 460 for selection of ISA modes. The boundary address register file 460 comprises a plurality of boundary address registers 461, each containing an address boundary, BDY2–BDYN. The address boundaries, in one embodiment of the present invention, are addresses within the address space of the CPU 450 that mark lower address bounds of ISA mode address ranges. Each of the address ranges is mapped to one of a number of ISA modes that are implemented by the CPU 450. In an alternative embodiment, the addresses denote upper address bounds of the address ranges. The block diagram 400 also depicts a memory 410 having locations that span the address space of the CPU 450. Within the memory 410 are stored program instructions 412, 416, 414, 418, 419 corresponding to N different instruction set architectures. For illustrative purposes, two components, component A 411 comprised of ISA 1 instructions 412 and component B 415 comprised of ISA 2 instructions 416, are specifically stored within the memory 410 to distinguish encoding of these components 411, 415 according to the present invention from like components 311, 315 described above with reference to FIG. 3. In addition, the block diagram 400 features program instructions corresponding to ISA 3 414, ISA N-1 418, and ISA N 419 stored in their respective address ranges in memory 410.

Operationally, the address space, or memory range, of the CPU 450 according to the present invention is partitioned according to the contents of the boundary address registers 461. In the embodiment shown in FIG. 4, a default value of address 0 provides a lower bound for the address range corresponding to ISA 1 mode. Register BAR 0 461 provides the lower bound, BDY2, corresponding to ISA 2 mode. Hence, the ISA 1 address range spans from address 0 through address BDY2-1. In an alternative embodiment, an additional register 461 is provided to specifically prescribe the lower bound for the ISA 1 address range. Register BAR 1 461 provides a lower bound for the ISA 3 address range, thus establishing an upper bound (i.e., BDY3-1) on an address range for ISA 2 components.

In the embodiment shown in FIG. 4, the memory space 410 is partitioned into unequal segments to accommodate the storage requirements of an exemplary multi-ISA application program stored therein. The featured embodiment implicitly maps ISA modes to the index of a particular boundary address register 461. For example, if an instruction's address falls within the address range bounded by the contents of BAR 0 461 and BAR 1 461, then the ISA decoding mode that is applied to the instruction is mapped to ISA mode 2. Mapping of a particular ISA mode to a particular boundary address register 461 can be achieved by the register's index, or, in an alternative embodiment, a portion of the contents of the boundary address register 461 comprise a field (not shown) that indicates the particular ISA mode to be used to decode/execute instructions that fall within that address range.

In an embedded application embodiment, contents of the boundary register file 460 are established during initialization of the CPU 450 via hardwired signals (not shown) or via the execution of code from a boot read-only memory (ROM) (not shown). In a non-embedded embodiment, contents of the register file 460 can be established either via boot ROM during initialization, or the boundaries can be dynamically altered by an operating system as application programs are fetched and loaded into the memory 410.

Note that both components A 411 and B 415, in contrast to like components 311, 315 discussed with reference to FIG. 3, do not contain any "mode switch" instructions. This is because mode switch instructions are not required for the processor 450 according to the present invention; ISA mode management is directly mapped to address ranges in the CPU's address space. The ISA 1 instruction 412 that directs the CPU 450 to transfer program flow to address Y is merely an ISA 1 jump instruction 412. And the ISA 2 instruction 416 that directs the CPU 450 to return program flow to address X is merely an ISA 2 jump instruction 416. Component A 411 is not required to know the ISA mode of any of the components that it references. For example, if a system designer were to recompile component B 415 such that it comprised program instructions according to ISA 3 mode, then component B 415 would be the only component that required changing within the application program. Linker software would then assign the newly encoded component B 415 to the address range corresponding to ISA 3 mode. Hence, the present invention minimizes the number of changes that are required when reusing previously compiled components in a multi-ISA application program.

Figure 5:
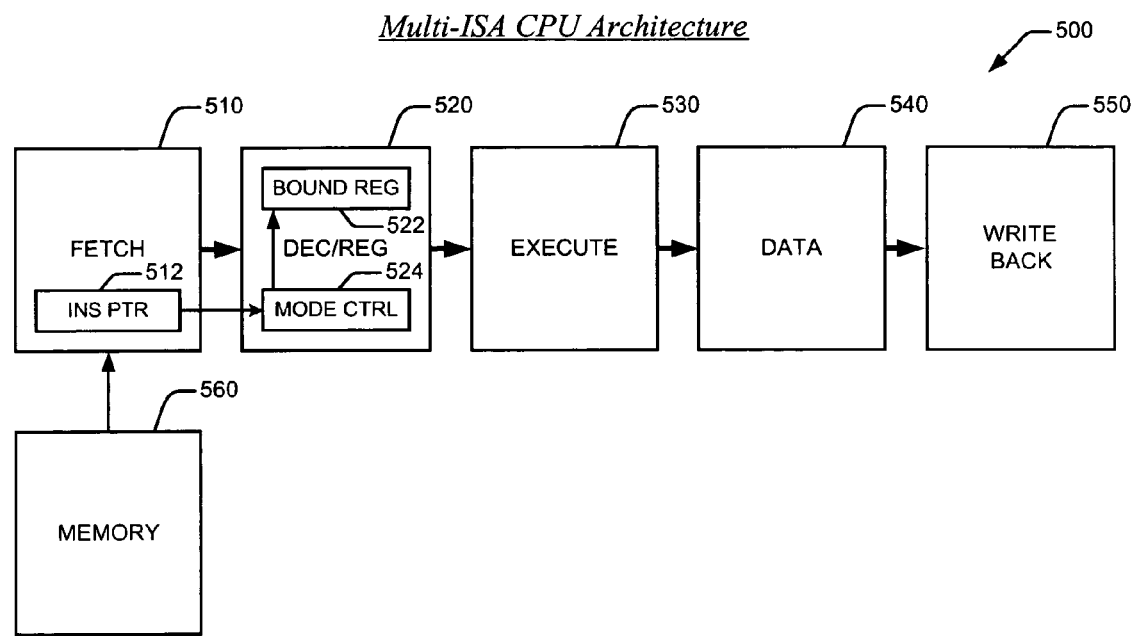
FIG. 5 is a block diagram illustrating pipeline stages of a multiple-ISA processor according to the present invention.

Now referring to FIG. 5, a block diagram is presented illustrating pipeline stages of a multiple-ISA processor 500 according to the present invention. The processor 500 includes a fetch stage 510, a decode/register stage 520, an execute stage 530, a data stage 540, and a write back stage 550. The block diagram also depicts a memory 560 that provides program instructions to the fetch stage 510 of the CPU 500. A boundary register file 522 within the decode/register stage 520 is coupled to ISA mode control logic 524.

In operation, the fetch stage 510 fetches program instructions from the memory 560 in an order prescribed by an application program. The address of each fetched program instruction is carried along with the program instruction in an instruction pointer buffer 512. Fetched program instructions and their addresses are provided to the decode/register stage 520.

The decode/register stage 520 decodes a fetched program instruction into control words/signals that direct logic in subsequent stages 530, 540, 550 of the CPU 500 to perform certain subtasks corresponding to an operation prescribed by the fetched program instruction. Additionally, contents of a general purpose register file (not shown) are accessed as prescribed by the program instruction within the decode/register stage. In the embodiment of the present invention shown in FIG. 5, when the program instruction is provided to the decode/register stage 520, the program instruction's address is received into the mode control logic 524. The mode control logic 524 compares the program instruction's address against the contents of the boundary register file 522 to determine a particular address range within which the address lies. The mode control logic 524 then selects a particular ISA mode that corresponds to a particular boundary address register (not shown) whose contents bound the particular address range. Thus, the program instruction is decoded and executed according to the particular ISA mode selected by the mode control logic 524.

Control words/signals and the contents of general purpose registers (if any) are provided to the execute stage 530, wherein results of the prescribed operation are generated. The results are provided to the data stage 540.

The data stage 540 executes load and store operations to data memory (not shown). Contents of a general purpose register are written to the data memory as prescribed by logic within this stage 540 or contents of a data memory location can be retrieved and provided to the write back stage 550.

The write back stage 550 writes the results generated in the execute stage 530 or contents of data memory retrieved by the data stage 540 into prescribed registers in the general purpose register file. Hence, program instructions are fetched from memory 560 by the fetch stage logic 510 and synchronously proceed through subsequent CPU stages 520–550 in a fashion very much like an assembly line. Accordingly, the present invention does not require that any additional "switch" or "veneer" instructions be inserted into the pipeline flow in order to explicitly direct the CPU 500 to switch ISA modes because a given program instruction's ISA mode is implicitly carried in its corresponding address. This is advantageous from an execution speed perspective because the insertion of additional instructions into the flow of the pipeline bogs down the execution of an application program.

The architectural stages 510–550 of the CPU embodiment presented in FIG. 5 are representative of a multi-ISA CPU. Particular CPUs may have more or less stages, or the functions of a particular CPU may be partitioned differently, or certain functions may appear in a slightly different order (such as those functions discussed with reference to the execute 530 and data stages 540). Regardless of the variations that exist, however, one skilled in the art will appreciate that the ISA mode selection logic 524 must be within or precede the decode stage 520. The illustrated CPU embodiment 500 stations the mode control logic 524 and the boundary register file 522 within the decode/register stage 520 because other general purpose registers are accessed within this stage 520 as well.

Figure 6:
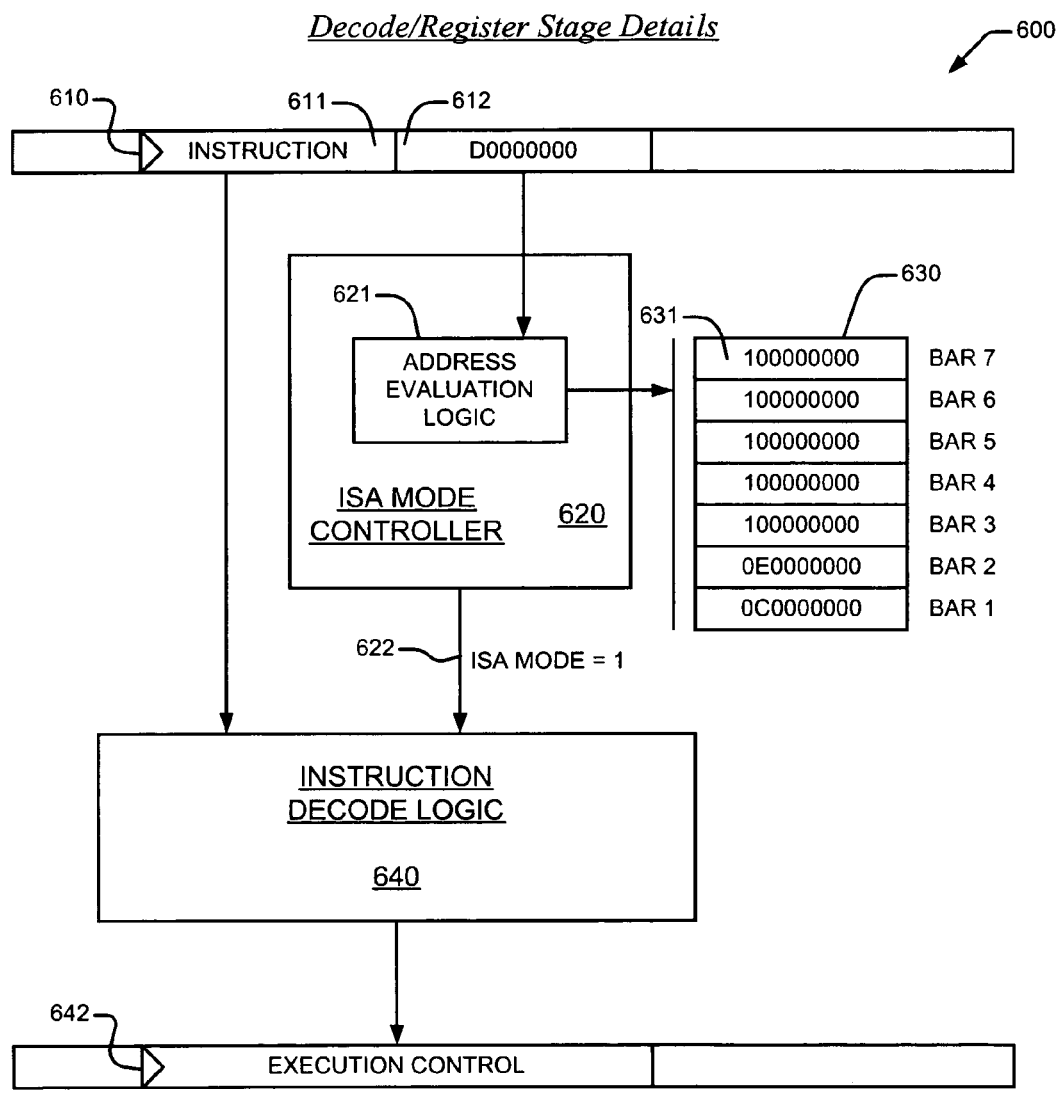
FIG. 6 is a block diagram depicting ISA mode selection logic within the decode/register stage of the processor shown in FIG. 5.

Now referring to FIG. 6, a block diagram is presented depicting ISA mode selection logic 620 within a decode/register stage 600 of the processor 500 shown in FIG. 5. The decode/register stage 600 has instruction decode logic 640 that receives a program instruction from a program instruction register 610. The register 610 has an instruction field 611 for the program instruction itself (i.e., binary representation of the instruction including, for example, opcode) and an address field 612 that contains the address of the program instruction. Contents of the instruction field 611 are provided to the instruction decoder 640 and contents of the address field 612 are provided to the ISA mode selection logic 620. The ISA mode selection logic 620 includes address evaluation logic 621 that is coupled to a boundary address register file 630. The ISA mode controller 620 provides an ISA mode output via bus 622 to the instruction decoder 640. The instruction decoder 640 outputs decoded control words/signals to subsequent CPU stages (not shown) via an execution control register 642. Exemplary ISA mode address range boundaries are shown loaded within boundary address registers BAR 1 631 through BAR 7 631.

Operationally, as a program instruction flows from fetch stage logic (not shown) to the decode/register stage 600, its address is retrieved by the address evaluation logic 621 from the address field 612 of the instruction buffer 610. The address evaluation logic 621 compares the retrieved address against the address ranges defined by the contents of the boundary address registers 631 in the register file 630. In one embodiment, the address evaluation logic 621 sequentially compares the retrieved address to the contents of the registers 631 to determine the particular address range within which the retrieved address lies. In an alternative embodiment, the address evaluation logic 621 performs parallel comparisons to determine the particular address range. As FIG. 6 depicts, retrieved address D0000000 falls within the particular address range bounded by addresses 0C0000000 and 0E0000000 prescribed respectively by boundary address registers BAR 1 631 and BAR 2 631. In a lower address bound embodiment, the retrieved address of the program instruction is mapped to register BAR 1 631. The address evaluation logic 621 confirms to the ISA mode controller 620 that address D0000000 corresponds to boundary address register BAR 1. The mode selector 620, in turn, outputs ISA mode 1 over bus 622.

Accordingly, the instruction decoder 640 implements decoding rules according to ISA mode 1 to correctly decode and execute the ISA 1 program instruction provided in the instruction field 611 of the instruction buffer 610. The program instruction's correctly decoded control words/signals are thus output to the execution control register 642.

Figure 7:
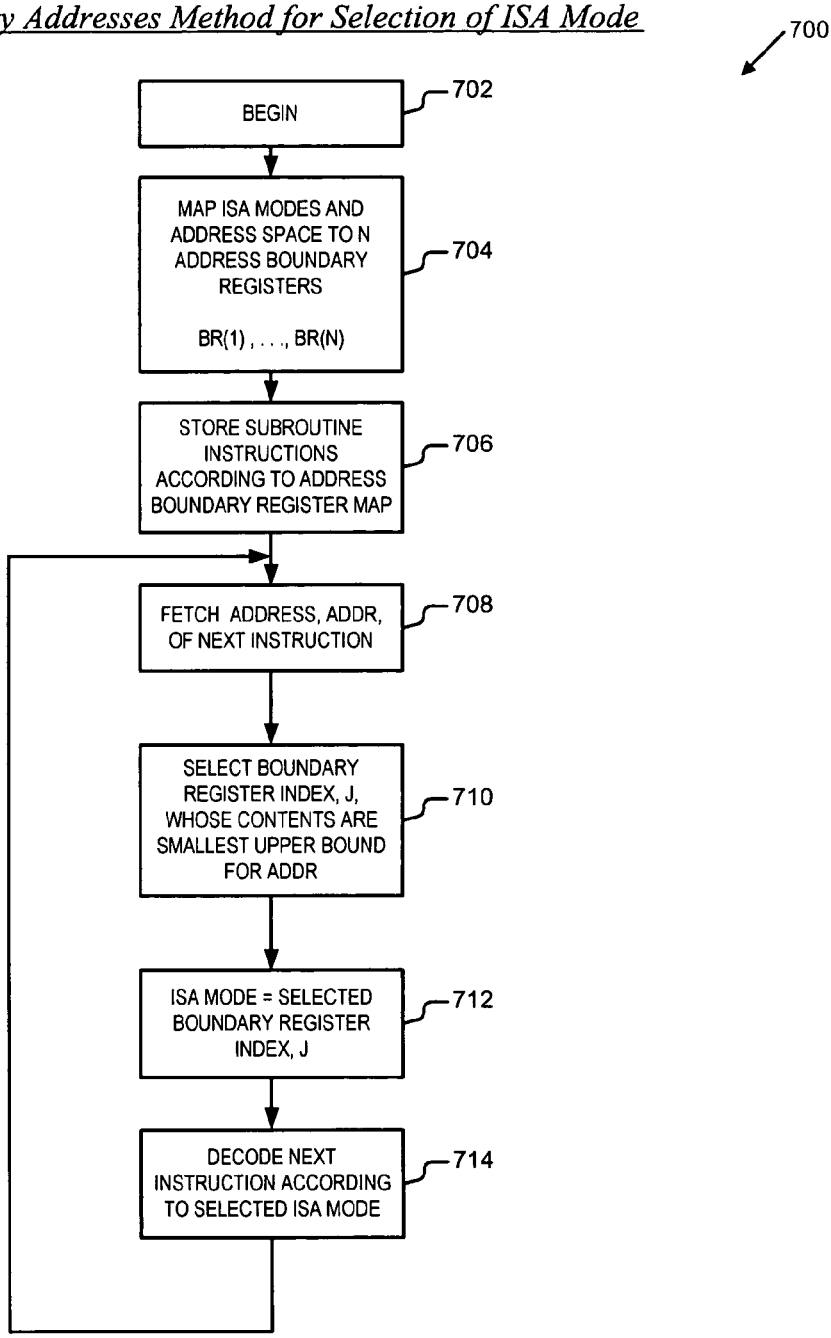
FIG. 7 is a flow chart illustrating a method according to the present invention for encoding and executing components of a multiple-ISA application program.

Now referring to FIG. 7, a flow chart 700 is presented illustrating a method according to the present invention for encoding and executing components of a multiple-ISA application program.

Flow begins at block 702, where compiled components of a multi-ISA application program are provided to a linker/loader application program according to the present invention. Flow then proceeds to block 704.

At block 704, software within the linker/loader program processes the components of the multi-ISA application program. The linker/loader segregates components of the program into categories corresponding to each one of a plurality of ISA modes that are employed within the application program. The distribution of address space required among all of the components falling into each one of the ISA modes is used by the linker/loader to determine and establish address ranges in the address space of a CPU according to the present invention. Each of the address ranges is mapped to an address boundary that is to be stored in a corresponding address boundary register within the CPU. Flow then proceeds to block 706.

At block 706, the linker/loader loads contents of the boundary address registers and all of the program components into their corresponding address range in a memory device (or a file) for execution by the CPU. Flow then proceeds to block 708.

At block 708, the CPU according to the present invention fetches a next instruction of the application program from the memory into which it has been loaded. Along with the next instruction, an address of the next instruction, ADDR, is fetched. Flow then proceeds to block 710.

At block 710, address comparison logic within the CPU compares the address of the next instruction, ADDR, against the address boundaries stored in the address boundary registers. In one embodiment, the boundary register index whose contents are the smallest upper bound for the address is determined by the address comparison logic. Flow then proceeds to block 712.

At block 712, ISA mode selection logic in the CPU selects a specific ISA decoding mode for the next instruction that equals the boundary register index determined in block 710. Flow then proceeds to block 714.

At block 714, the next instruction is decoded by a multi-ISA instruction decoder in the CPU in accordance with decoding rules corresponding to the particular ISA decoding mode selected in block 712. Flow then proceeds to block 708, where an instruction following the next instruction is fetched from memory.

The method continues until the CPU ceases fetching instructions, an event that is typically caused by removal of power.

The examples of FIGS. 4 through 7 clearly illustrate that a multi-ISA application program can be effectively executed on a CPU according to the present invention without requiring complex cosmetic interrelationships between calling and called program components. This is because the present invention allows a program instruction's ISA mode to be established by its address within the CPU's address space. When a designer desires to change the ISA mode of a given component within the application program, all that is required is that the given component be recoded into the chosen ISA mode; no changes are required to be made to components that call the given component or to components called by the given component. Moreover, address ranges corresponding to different ISA modes can be flexibly tailored to serve differing ISA mode storage requirements of the program because address range boundaries are based upon the contents of a boundary address register file that is loaded prior to or at the time of execution of the application program.

Although the present invention and its objects, features, and advantages have been described in detail, other embodiments are encompassed by the invention as well. In addition to implementations of the invention using hardware, the invention can be embodied in software disposed, for example, in a computer usable (e.g., readable) medium configured to store the software (i.e., computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, and optical disc (e.g., CD-ROM, DVD-ROM, etc.), and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core that is embodied in program code and may be transformed to hardware as part of the production of integrated circuits. Also, the invention may be embodied as a combination of hardware and software.

In addition, the present invention has been particularly characterized in terms of a CPU or microprocessor. In particular, one embodiment of the present invention described with reference to FIG. 5 portrays application within a 5-stage pipelined CPU 500. These specific embodiments and characterizations are presented herein as representative embodiments for the present invention, however, such description should by no means restrict application of the concept of basing ISA decoding mode for the processing of program instructions upon prescribed and variable-sized address ranges. On the contrary, the present invention can be embodied within a multi-ISA graphics processor, a multi-ISA digital signal processor, as well as less commonly known components to include multi-ISA communications processors, multi-ISA video processors, multi-ISA memory controllers, and multi-ISA micro controllers.

Furthermore, the present invention has been specifically presented in terms of a multiple-ISA CPU that is capable of implementing certain well-known instruction set architectures to include MIPS32, MIPS64, x86, and PowerPC. These exemplary ISAs are employed herein because they provide a recognizable basis for teaching the present invention, however, it should not be construed that application of the present invention is limited to these ISAs. Rather, the present invention contemplates boundary address-based ISA mode distinction of program instructions included in instruction set extensions within a family of instructions such as MIPS32, MIPS64, 16/32-bit x86, MMX, etc., as well as distinctions between the ISAs of different manufacturers.

Finally, CPU embodiments according to the present invention have been described at a level that does not rely upon the type of instruction sets employed, how the instructions are formatted, or how the instructions are processed within the CPU. This is because address-based ISA mode selection contemplates application within complex instruction set architectures (CISC), reduced instruction set architectures (RISC), architectures providing for fixed-length or variable-length instructions, in-order processors, and out-of-order processors as well as the embodiments specifically described herein.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. Instruction Set Architecture (ISA) selection logic within a CPU for selecting an ISA decoding mode for a program instruction, the selection logic comprising:
a plurality of boundary address registers for storing boundary addresses that partition an address space into a plurality of address ranges, each of the plurality of address ranges corresponding to one of a plurality of ISA decoding modes; and
an ISA mode controller, coupled to the plurality of boundary address registers, that includes address evaluation logic,
wherein the ISA mode controller
receives an address of a program instruction to be decoded,
sequentially compares the address to boundary addresses stored in the plurality of boundary address registers, and
determines an ISA decoding mode for the program instruction based upon the comparison of the address to the boundary addresses.

2. The ISA selection logic of claim 1, wherein the ISA mode controller provides the ISA decoding mode to an instruction decoder to enable correct decoding of the program instruction.

3. The ISA selection logic of claim 1, wherein the plurality of boundary address registers store boundary addresses that represent lower address bounds for the plurality of address ranges.

4. The ISA selection logic of claim 1, wherein the plurality of boundary address registers store boundary addresses that represent upper address bounds for the plurality of address ranges.

5. The ISA selection logic of claim 1, wherein the plurality of boundary address registers store boundary addresses that partition the address space into a plurality of unequal address ranges.

6. The ISA selection logic of claim 1, wherein boundary addresses are written to the plurality of boundary address registers during initialization of the CPU.

7. The ISA selection logic of claim 1, wherein boundary addresses are altered by an operating system as application programs are fetched and loaded into memory.

8. The ISA selection logic of claim 1, wherein software within a linker/loader program determines the boundary addresses that are loaded into the plurality of boundary address registers.

9. A multiple-ISA mode processor, comprising:
an ISA mode controller that includes address evaluation logic;
a plurality of boundary address registers, coupled to the ISA mode controller; and
an instruction decoder, coupled to the ISA mode controller,
wherein the ISA mode controller
receives an address of a program instruction to be decoded,
sequentially compares the address to boundary addresses stored in the plurality of boundary address registers that partition an address space of the processor into a plurality of address ranges,
determines an ISA decoding mode corresponding to one of the plurality of address ranges for the program instruction based upon the comparison of the address to the boundary addresses, and
provides the ISA decoding mode for the program instruction to the instruction decoder.

10. The processor of claim 9, wherein the plurality of boundary address registers store boundary addresses that represent lower address bounds for the plurality of address ranges.

11. The processor of claim 9, wherein the plurality of boundary address registers store boundary addresses that represent upper address bounds for the plurality of address ranges.

12. The processor of claim 9, wherein the plurality of boundary address registers store boundary addresses that partition the address space into a plurality of unequal address ranges.

13. The processor of claim 9, wherein boundary addresses are written to the plurality of boundary address registers during initialization of the processor.

14. The processor of claim 9, wherein boundary addresses are altered by an operating system as application programs are fetched and loaded into memory.

15. The processor of claim 9, wherein software within a linker/loader program determines the boundary addresses that are loaded into the plurality of boundary address registers.

16. A method for determining ISA decoding modes for program instructions of a multiple-ISA application program running on a processor, wherein the application program includes instructions associated with a first ISA mode requiring a first amount of memory space and instructions associated with a second ISA mode requiring a second amount of memory space, and wherein the processor includes a plurality of boundary address registers and an ISA mode controller coupled to the plurality of boundary address registers, the method comprising:
(1) storing application program instructions associated with the first ISA mode in memory beginning at a first memory address;
(2) writing the first memory address to a first boundary address register of the plurality of boundary address registers, wherein the first memory address acts as a first boundary address that partitions the memory and creates a first memory address range;
(3) storing application program instructions associated with the second ISA mode in memory beginning at a second memory address;
(4) writing the second memory address to a second boundary address register of the plurality of boundary address registers, wherein the second memory address acts as a second boundary address that partitions the memory and creates a second memory address range;
(5) retrieving a program instruction form a third memory address;
(6) sequentially comparing the third memory address with the first memory address in the first boundary address register and the second memory address in the second boundary address register to determine whether the third memory address corresponds to the first memory address range or the second memory address range;
(7) generating, if the third memory address corresponds to the first memory address range, a first ISA mode indicator output with the ISA mode controller; and
(8) generating, if the third memory address corresponds to the second memory address range, a second ISA mode indicator output with the ISA mode controller.

17. The method of claim 16, wherein a memory address having a value greater than the first boundary address and less than the second boundary address corresponds to the first memory address range.

18. The method of claim 16, wherein a memory address having a value less than the first boundary address and greater than the second boundary address corresponds to the first memory address range.

19. The method of claim 16, wherein step (2) and step (4) occur only during initialization of the processor.

20. The method of claim 16, wherein step (2) and step (4) are performed by an operating system as application programs are fetched and loaded into memory.

21. Instruction Set Architecture (ISA) selection logic within a CPU for selecting an ISA decoding mode for a program instruction, the selection logic comprising:
a plurality of boundary address registers for storing boundary addresses that partition an address space into a plurality of address ranges, each of the plurality of address ranges corresponding to one of a plurality of ISA decoding modes; and
an ISA mode controller, coupled to the plurality of boundary address registers, that includes address evaluation logic,
wherein the ISA mode controller
receives a complete address of a program instruction to be decoded,
compares, in parallel, the complete address to boundary addresses stored in the plurality of boundary address registers, and
determines an ISA decoding mode for the program instruction based upon the comparison of the complete address to the boundary addresses.

22. The ISA selection logic of claim 21, wherein the ISA mode controller provides the ISA decoding mode to an instruction decoder to enable correct decoding of the program instruction.

23. The ISA selection logic of claim 21, wherein the plurality of boundary address registers store boundary addresses that represent lower address bounds for the plurality of address ranges.

24. The ISA selection logic of claim 21, wherein the plurality of boundary address registers store boundary addresses that represent upper address bounds for the plurality of address ranges.

25. The ISA selection logic of claim 21, wherein the plurality of boundary address registers store boundary addresses that partition the address space into a plurality of unequal address ranges.

26. The ISA selection logic of claim 21, wherein boundary addresses are written to the plurality of boundary address registers during initialization of the CPU.

27. The ISA selection logic of claim 21, wherein boundary addresses are altered by an operating system as application programs are fetched and loaded into memory.

28. The ISA selection logic of claim 21, wherein software within a linker/loader program determines the boundary addresses that are loaded into the plurality of boundary address registers.

29. A multiple-ISA mode processor, comprising:
an ISA mode controller that includes address evaluation logic;
a plurality of boundary address registers, coupled to the ISA mode controller; and
an instruction decoder, coupled to the ISA mode controller,
wherein the ISA mode controller
receives a complete address of a program instruction to be decoded,
compares, in parallel, the complete address to boundary addresses stored in the plurality of boundary address registers that partition an address space of the processor into a plurality of address ranges,
determines an ISA decoding mode corresponding to one of the plurality of address ranges for the program instruction based upon the comparison of the complete address to the boundary addresses, and provides the ISA decoding mode for the program instruction to the instruction decoder.

30. The processor of claim 29, wherein the plurality of boundary address registers store boundary addresses that represent lower address bounds for the plurality of address ranges.

31. The processor of claim 29, wherein the plurality of boundary address registers store boundary addresses that represent upper address bounds for the plurality of address ranges.

32. The processor of claim 29, wherein the plurality of boundary address registers store boundary addresses that partition the address space into a plurality of unequal address ranges.

33. The processor of claim 29, wherein boundary addresses are written to the plurality of boundary address registers during initialization of the processor.

34. The processor of claim 29, wherein boundary addresses are altered by an operating system as application programs are fetched and loaded into memory.

35. The processor of claim 29, wherein software within a linker/loader program determines the boundary addresses that are loaded into the plurality of boundary address registers.

36. A method for determining ISA decoding modes for program instructions of a multiple-ISA application program running on a processor, wherein the application program includes instructions associated with a first ISA mode requiring a first amount of memory space and instructions associated with a second ISA mode requiring a second amount of memory space, and wherein the processor includes a plurality of boundary address registers and an ISA mode controller coupled to the plurality of boundary address registers, the method comprising:

(1) storing application program instructions associated with the first ISA mode in memory beginning at a first memory address;

(2) writing the first memory address to a first boundary address register of the plurality of boundary address registers, wherein the first memory address acts as a first boundary address that partitions the memory and creates a first memory address range;

(3) storing application program instructions associated with the second ISA mode in memory beginning at a second memory address;

(4) writing the second memory address to a second boundary address register of the plurality of boundary address registers, wherein the second memory address acts as a second boundary address that partitions the memory and creates a second memory address range;

(5) retrieving a program instruction form a third memory address;

(6) comparing, in parallel, the complete third memory address with the first memory address in the first boundary address register and the second memory address in the second boundary address register to determine whether the third memory address corresponds to the first memory address range or the second memory address range;

(7) generating, if the third memory address corresponds to the first memory address range, a first ISA mode indicator output with the ISA mode controller; and (8) generating, if the third memory address corresponds to the second memory address range, a second ISA mode indicator output with the ISA mode controller.

* * * * *